(12) United States Patent
Rao et al.

(10) Patent No.: US 12,499,436 B2
(45) Date of Patent: Dec. 16, 2025

(54) DETERMINING AN OPTIMUM QUANTITY OF FRACTIONAL NON-FUNGIBLE TOKENS TO GENERATE FOR CONTENT AND A CONTENT EXCHANGE

(71) Applicant: Accenture Global Solutions Limited, Dublin (IE)

(72) Inventors: Srikanth G. Rao, Bangalore (IN); Mathangi Sandilya, Bangalore (IN); Anand Vijendra, Bangalore (IN); Sagnik Mazumder, Kolkata (IN); Abhinav Shukla, Mumbai (IN); Ravi Shankar Nori, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 627 days.

(21) Appl. No.: 17/804,343

(22) Filed: May 27, 2022

(65) Prior Publication Data
US 2023/0401570 A1    Dec. 14, 2023

(51) Int. Cl.
*G06Q 20/36* (2012.01)
(52) U.S. Cl.
CPC ..... *G06Q 20/3678* (2013.01); *G06Q 2220/00* (2013.01)
(58) Field of Classification Search
None
See application file for complete search history.

(56) References Cited

U.S. PATENT DOCUMENTS

| | | | | |
|---|---|---|---|---|
| 11,367,060 | B1* | 6/2022 | Barbashin | H04N 21/2743 |
| 11,985,253 | B2* | 5/2024 | Milam | H04L 63/12 |
| 2014/0279774 | A1* | 9/2014 | Wang | G06F 16/951 706/20 |
| 2017/0140743 | A1* | 5/2017 | Gouyon | G06Q 30/0255 |
| 2018/0218283 | A1* | 8/2018 | Jenson | G06Q 50/01 |
| 2019/0378038 | A1* | 12/2019 | Shadpour | G06N 20/20 |
| 2020/0005284 | A1* | 1/2020 | Vijayan | G06Q 20/065 |
| 2020/0273048 | A1* | 8/2020 | Andon | G06Q 10/02 |
| 2020/0301973 | A1* | 9/2020 | Sewani | G06F 16/9035 |
| 2020/0372066 | A1* | 11/2020 | Saggi | G06V 20/47 |
| 2022/0069996 | A1* | 3/2022 | Xue | H04L 9/3297 |

(Continued)

FOREIGN PATENT DOCUMENTS

WO   WO-2021044221 A1 *  3/2021   ............ G06Q 40/04

*Primary Examiner* — Neha Patel
*Assistant Examiner* — Jahed Ali
(74) *Attorney, Agent, or Firm* — Polsinelli PC

(57) ABSTRACT

A device may identify standard parameters and real-time parameters associated with content of a content type, and may process the content type, the standard parameters, and the real-time parameters, with a parameter unification model, to generate derived parameters for the content. The device may process the derived parameters and the content type, with a multi-level linear regression machine learning model, to calculate a content score for the content, and may process the derived parameters and the content score, with a linear regression machine learning model, to calculate a quantity of f-NFTs to generate for the content and a divestment ratio. The device may create a unique reference to the content, and may create an NFT for the content based on the unique reference. The device may generate the quantity of f-NFTs for the content based on the NFT, and may provide the quantity of f-NFTs to a content exchange.

20 Claims, 13 Drawing Sheets

(56) References Cited

U.S. PATENT DOCUMENTS

| | | | |
|---|---|---|---|
| 2022/0139566 A1* | 5/2022 | Gardina | G16B 50/20 |
| | | | 705/2 |
| 2022/0301141 A1* | 9/2022 | Shyu | G06T 7/0002 |
| 2023/0119641 A1* | 4/2023 | Meyers | A63F 13/69 |
| | | | 463/42 |
| 2023/0138023 A1* | 5/2023 | Yang | A63F 13/86 |
| | | | 463/42 |
| 2023/0186353 A1* | 6/2023 | Wadley | G06Q 30/0278 |
| | | | 705/306 |
| 2023/0267450 A1* | 8/2023 | Bathen | G06Q 20/389 |
| | | | 705/66 |
| 2024/0037618 A1* | 2/2024 | Korpman | G06Q 30/018 |

\* cited by examiner

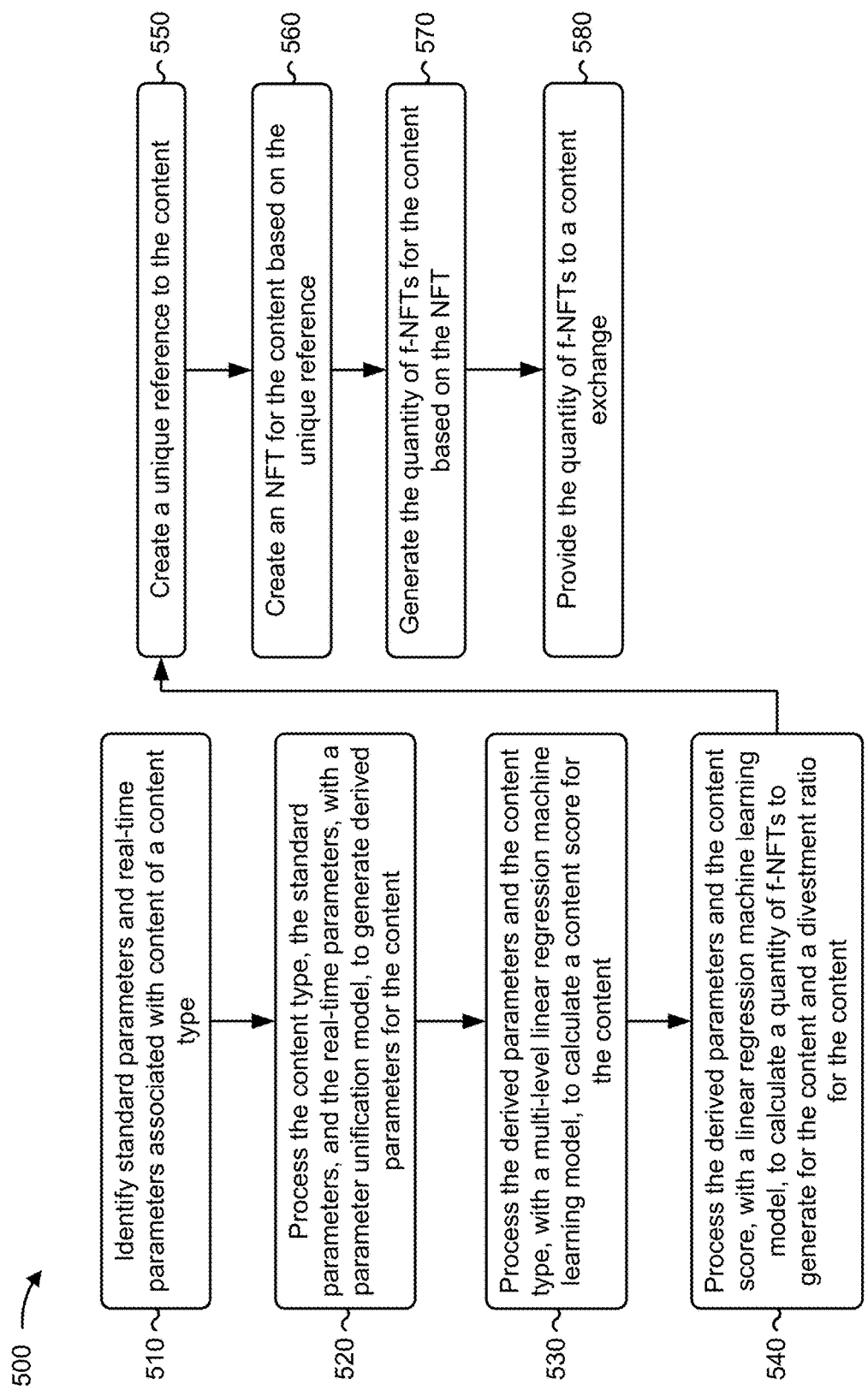

DETERMINING AN OPTIMUM QUANTITY OF FRACTIONAL NON-FUNGIBLE TOKENS TO GENERATE FOR CONTENT AND A CONTENT EXCHANGE

BACKGROUND

A non-fungible token (NFT) is a non-interchangeable unit of data stored on a blockchain and that can be sold and traded. An NFT may be associated with content, such as movies, photos, videos, audio, text, art, and/or the like. A fractional NFT (f-NFT) is a whole NFT that has been divided into smaller fractions, allowing several different entities (e.g., businesses, organizations, agencies, firms, and/or the like) and/or people to claim ownership of a piece of the same NFT. The NFT is fractionalized using a smart contract that generates a set number of tokens linked to the indivisible original NFT. These fractional tokens give each holder a percentage of ownership of an NFT, and can be traded or exchanged on secondary markets.

SUMMARY

Some implementations described herein relate to a method. The method may include identifying standard parameters and real-time parameters associated with content of a content type, and processing the content type, the standard parameters, and the real-time parameters, with a parameter unification model, to generate derived parameters for the content. The method may include processing the derived parameters and the content type, with a multi-level linear regression machine learning model, to calculate a content score for the content, and processing the derived parameters and the content score, with a linear regression machine learning model, to calculate a quantity of f-NFTs to generate for the content and a divestment ratio for the content. The method may include creating a unique reference to the content, and creating an NFT for the content based on the unique reference. The method may include generating the quantity of f-NFTs for the content based on the NFT, and providing the quantity of f-NFTs to a content exchange.

Some implementations described herein relate to a device. The device may include one or more memories and one or more processors coupled to the one or more memories. The one or more processors may be configured to identify standard parameters and real-time parameters associated with content of a content type, and process the content type, the standard parameters, and the real-time parameters, with a parameter unification model, to generate derived parameters for the content. The one or more processors may be configured to process the derived parameters and the content type, with a multi-level linear regression machine learning model, to calculate a content score for the content, and process the derived parameters and the content score, with a linear regression machine learning model, to calculate a quantity of f-NFTs to generate for the content and a divestment ratio for the content. The one or more processors may be configured to create a unique reference to the content, and an NFT for the content based on the unique reference. The one or more processors may be configured to generate the quantity of f-NFTs for the content based on the NFT, and transform a smart contract based on the f-NFTs and the divestment ratio to generate content stocks for trading. The one or more processors may be configured to provide the content stocks for sale on a content exchange.

Some implementations described herein relate to a non-transitory computer-readable medium that stores a set of instructions for a device. The set of instructions, when executed by one or more processors of the device, may cause the device to identify standard parameters and real-time parameters associated with content of a content type, and process the content type, the standard parameters, and the real-time parameters, with a parameter unification model, to generate derived parameters for the content. The set of instructions, when executed by one or more processors of the device, may cause the device to process the derived parameters and the content type, with a multi-level linear regression machine learning model, to calculate a content score for the content, and process the derived parameters and the content score, with a linear regression machine learning model, to calculate a quantity of f-NFTs to generate for the content and a divestment ratio for the content. The set of instructions, when executed by one or more processors of the device, may cause the device to create a unique reference to the content, and create an NFT for the content based on the unique reference. The set of instructions, when executed by one or more processors of the device, may cause the device to generate the quantity of f-NFTs for the content based on the NFT, and perform one or more actions based on the quantity of f-NFTs.

BRIEF DESCRIPTION OF THE DRAWINGS

FIG. 5 is a flowchart of an example process for determining an optimum quantity of f-NFTs to generate for content and a content exchange.

DETAILED DESCRIPTION

Figure 1A:
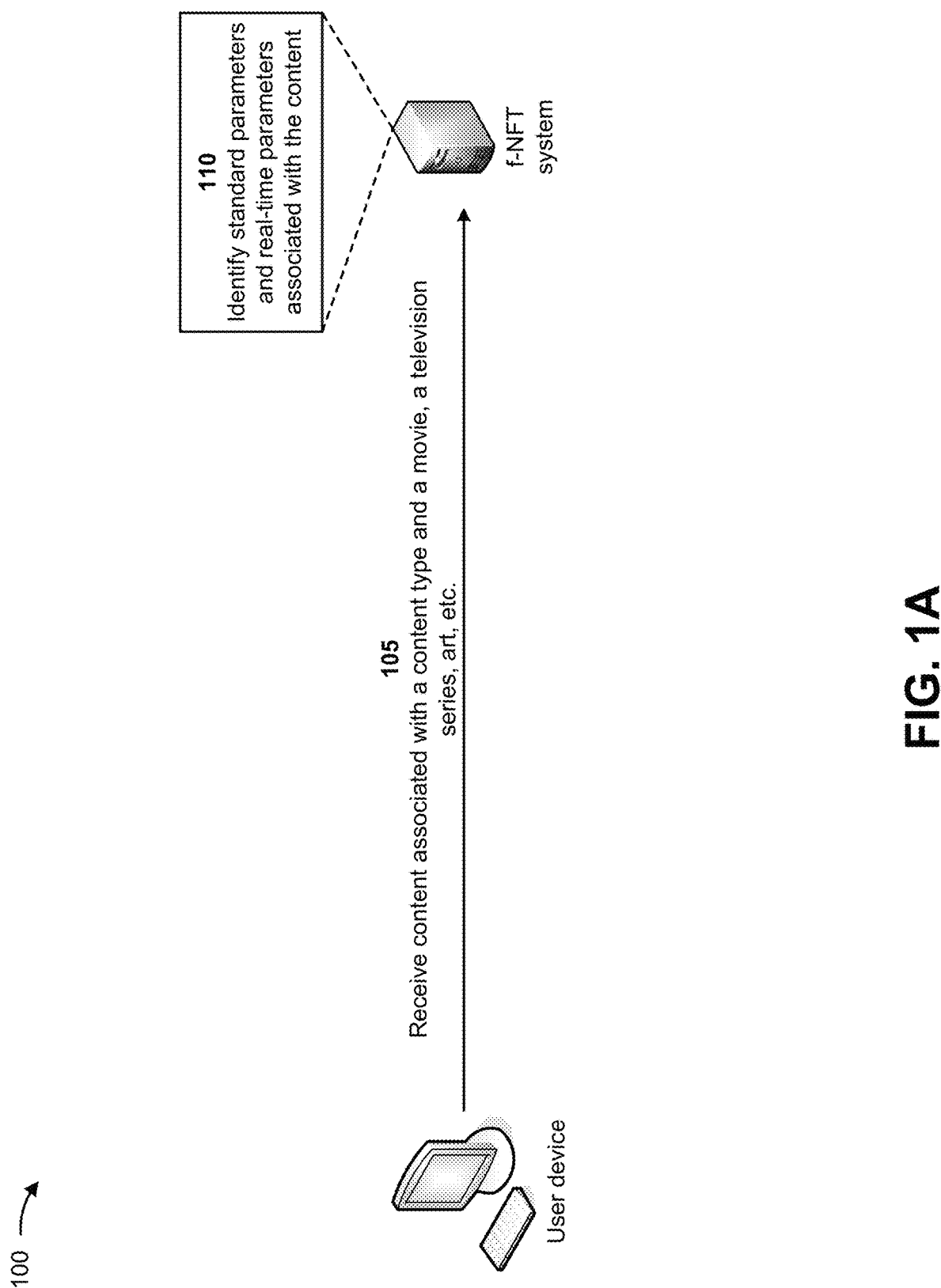
FIGS. 1A-1I are diagrams of an example implementation described herein.

The following detailed description of example implementations refers to the accompanying drawings. The same reference numbers in different drawings may identify the same or similar elements.

Content providers (e.g., providers of movies, television series, music, art, and/or the like) are experiencing limited ways of monetizing the content they produce. A traditional value chain for the content providers to monetize their content library has been very linear and limited to distribution (e.g., theater, television, over-the-top content, and/or the like), advertising, merchandising, and/or the like. In recent times, NFTs have shown a lot of promise for the content providers, but the content providers are not investing in NFTs due to several challenges in implementing NFTs. For example, current NFT marketplaces are not scaled to list and monetize large content libraries, content providers have no way to value their content, most NFT transactions lead to a transfer of ownership, NFTs are perceived as having limited liquidation options for investors, and/or the like. Therefore, current techniques for utilizing NFTs for content provided by content providers consume computing resources (e.g., processing resources, memory resources, communication resources, and/or the like), networking resources, and/or the like associated with attempting to identify content to utilize for NFTs, failing to identify valuable content to utilize for NFTs, erroneously liquidating NFTs associated with valuable content, failing to determine an appropriate quantity of NFTs to create for content, and/or the like.

Some implementations described herein relate to an f-NFT system that determines an optimum quantity of f-NFTs to generate for content and a content exchange. For example, the f-NFT system may identify standard parameters and real-time parameters associated with content of a content type, and may process the content type, the standard parameters, and the real-time parameters, with a parameter unification model, to generate derived parameters for the content. The f-NFT system may process the derived parameters and the content type, with a multi-level linear regression machine learning model, to calculate a content score for the content, and may process the derived parameters and the content score, with a linear regression machine learning model, to calculate a quantity of f-NFTs to generate for the content and a divestment ratio for the content. The f-NFT system may create a unique reference to the content, and may create an NFT for the content based on the unique reference. The f-NFT system may generate the quantity of f-NFTs for the content based on the NFT, and may provide the quantity of f-NFTs to a content exchange.

In this way, the f-NFT system determines an optimum quantity of f-NFTs to generate for content and a content exchange. The f-NFT system may provide a cryptocurrency-based valuation of content and a blockchain-based content trading exchange. The f-NFT system may determine scores for content of content providers, and may determine divestment metrics and quantities of f-NFTs to generate for the content based on the scores. The f-NFT system may transform NFTs of content into semi-fungible tokens (e.g., f-NFTs) that can be exchanged while maintaining the sanctity of ownership of the NFTs in the content providers. The f-NFT system may establish an immutable ledger of transactions, for the f-NFTs, that is written using smart contracts and policy-based real-time bookkeeping for authorizing and securing the transactions. This, in turn, conserves computing resources, networking resources, transportation resources, and/or the like that would otherwise have been consumed in attempting to identify content to utilize for NFTs, failing to identify valuable content to utilize for NFTs, erroneously liquidating NFTs associated with valuable content, failing to determine an appropriate quantity of NFTs to create for content, and/or the like.

FIGS. 1A-1I are diagrams of an example 100 associated with determining an optimum quantity of f-NFTs to generate for content and a content exchange. As shown in FIGS. 1A-1I, example 100 includes an f-NFT system associated with a user device. The f-NFT system may include a system that determines an optimum quantity of f-NFTs to generate for content and a content exchange. Further details of the f-NFT system and the user device are provided elsewhere herein.

As shown in FIG. 1A, and by reference number 105, the f-NFT system may receive content associated with a content type and a movie, a television series, art, audio, and/or the like. For example, the f-NFT system may continuously receive the content from the user device and/or a data source (e.g., a content provider data structure), may periodically receive the content from the user device and/or the data source, may receive the content from the user device and/or the data source based upon providing a request for the content to the user device and/or the data source, and/or the like. The content may include a quote, a song lyric, a poem, a photograph, a drawing, a documentary, a piece of art, a movie, a television series, a video clip, a music album, a song, a soundbite, a cartoon, a cartoon character, a movie character, a television character, a movie script, a television script, television dialogue, movie dialogue, and/or the like. The content may be associated with a content type, such as text (e.g., a quote, a song lyric, a poem, and/or the like), image (e.g., a photograph, a drawing, a piece of art, a cartoon, and/or the like), video (e.g., a movie, a television series, a video clip), audio (e.g., a music album, a song, a soundbite, and/or the like), and/or the like.

As further shown in FIG. 1A, and by reference number 110, the f-NFT system may identify standard parameters and real-time parameters associated with the content. For example, the content may be associated with standard parameters, such as a title of the content, a source of the content, a creator of the content, a file size of the content, a cast performing in the content, a time period of the content, an industry associated with the content, a season or episode of the content, a studio that generated the content, an artist that created the content, a production house that produced the content, merchandise associated with the content, and/or the like. The f-NFT system may analyze metadata associated with the content, and may identify the standard parameters based on analyzing the metadata. The content may be associated with real-time parameters, such as reviews of the content (e.g., social media reviews of the content), availability of the content (e.g., showtimes of movies, air dates of television shows, and/or the like), and/or the like. The f-NFT system may analyze web-based data associated with social media, content availability, and/or the like, and may identify the real-time parameters associated with the content based on analyzing the web-based data.

Figure 1B:
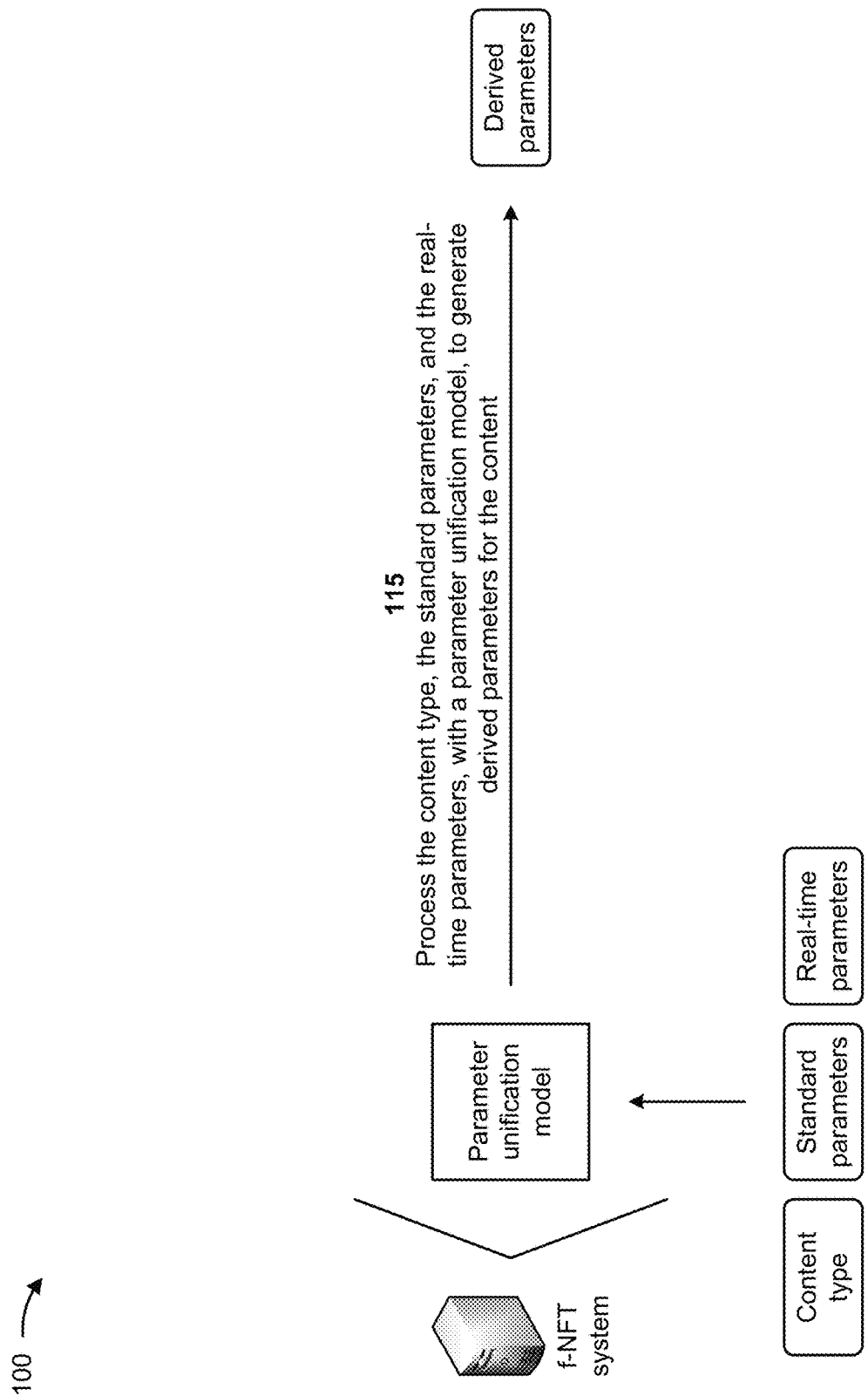

As shown in FIG. 1B, and by reference number 115, the f-NFT system may process the content type, the standard parameters, and the real-time parameters, with a parameter unification model, to generate derived parameters for the content. For example, the parameter unification model may include a model that organizes the content type, the standard parameters, and the real-time parameters in a hierarchy that may be utilized to determine the derived parameters for the content. The parameter unification model may utilize an environmental, social, and governance (ESG) report to generate an ESG index (e.g., a derived parameter) for the content. The parameter unification model may utilize a category of the content (e.g., action, thriller, comedy, horror, drama, contemporary, modern, abstract, and/or the like) to generate a genre (e.g., a derived parameter) for the content. The parameter unification model may utilize a quantity of sequels, a quantity of prequels, a quantity of seasons, a quantity of episodes, a popularity, and/or the like associated with the content to generate a longevity index (e.g., a derived parameter) for the content. The parameter unification model may utilize theatrical revenue, advertising revenue, merchandising revenue, broadcast revenue, and/or the like to generate a revenue value (e.g., a derived parameter) for the content. The parameter unification model may utilize industry and social media reviews to generate a review or a rating (e.g., a derived parameter) for the content. The parameter unification model may utilize the ESG report and the industry and social media reviews to generate a reputation index (e.g., a derived parameter) for the content.

In some implementations, the parameter unification model may utilize feature engineering to assign different numerical values to different content types, different standard parameters, and different real-time parameters. Once the different numerical values are assigned, the parameter unification model utilize the different numerical values to generate the derived parameters for the content. In some implementations, the derived parameters may represent one or more characteristics of the content.

Figure 1C:
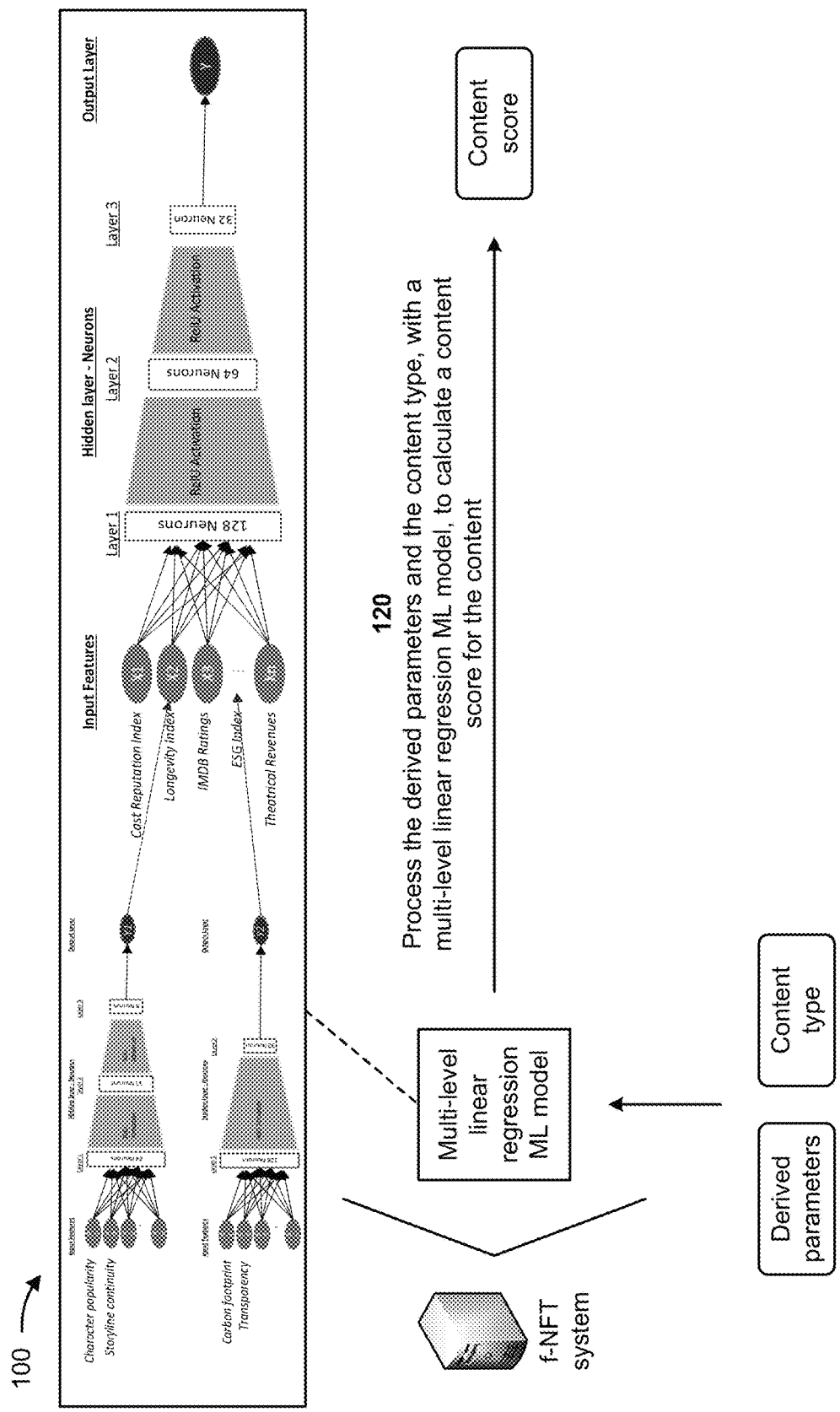

As shown in FIG. 1C, and by reference number 120, the f-NFT system may process the derived parameters and the content type, with a multi-level linear regression machine learning (ML) model, to calculate a content score for the content. For example, the f-NFT system may utilize the multi-level linear regression machine learning model to assign weights to the derived parameters so that the content score may be accurately calculated. In some implementations, the multi-level linear regression machine learning model may include a linear regression model using a deep neural network model (e.g., a rectified linear activation function (ReLU) activation) to calculate the content score according to the content type. As further shown in FIG. 1C, the deep neural network model may receive outputs from the parameter unification model (e.g., a deep neural network model). The parameter unification model may utilize the content type, the standard parameters, and the real-time parameters (e.g., character popularity, storyline continuity, carbon footprint, transparency, and/or the like) as inputs and may generate the derived parameters (e.g., cast reputation index, longevity index, ratings, ESG index, theatrical revenues, and/or the like) as the outputs. The deep neural network model may utilize the outputs from the parameter unification model as inputs, and may calculate the content score based on the inputs.

In some implementations, the multi-level linear regression machine learning model may utilize forward propagation to propagate the derived parameters and the content type through the deep neural network model. The multi-level linear regression machine learning model may also utilize a cost function (e.g., a mean squared error), gradient descent (e.g., an iterative first-order optimization model used to find a local minimum/maximum), and an optimizer (e.g., an Adam optimizer with a particular learning rate (e.g., 0.001)) to calculate an optimal content score.

Figure 1D:
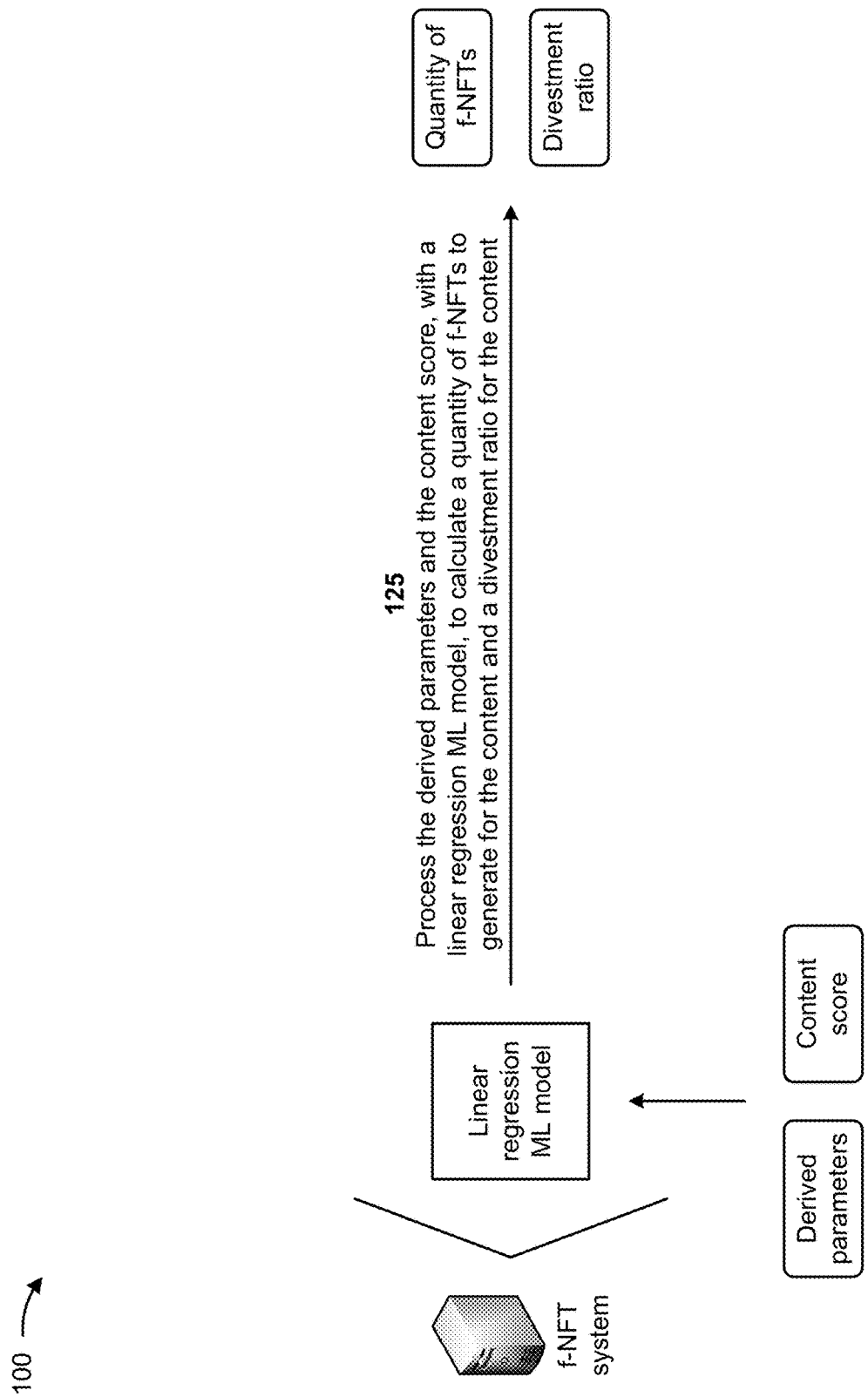

As shown in FIG. 1D, and by reference number 125, the f-NFT system may process the derived parameters and the content score, with a linear regression machine learning model, to calculate a quantity of f-NFTs to generate for the content and a divestment ratio for the content. For example, when processing the derived parameters and the content score, with the linear regression machine learning model, to calculate the quantity of f-NFTs and the divestment ratio, the f-NFT system may calculate the quantity of f-NFTs and the divestment ratio based on the content score and based on the derived parameters that influence a future capability of the content. In some implementations, the linear regression machine learning model may utilize a cost function (e.g., a mean squared error), gradient descent (e.g., an iterative first-order optimization model), and an optimizer (e.g., an Adam optimizer with a particular learning rate (e.g., 0.001)) to calculate an optimal quantity of f-NFTs and divestment ratio. In one example, the linear regression machine learning model may utilize the content score and particular derived parameters (e.g., a longevity index for the content, a reputation index for the content, a popularity of the content, a reputation of a creator of the content, a reputation of a cast of the content, and/or the like) to calculate the quantity of f-NFTs and the divestment ratio.

Figure 1E:
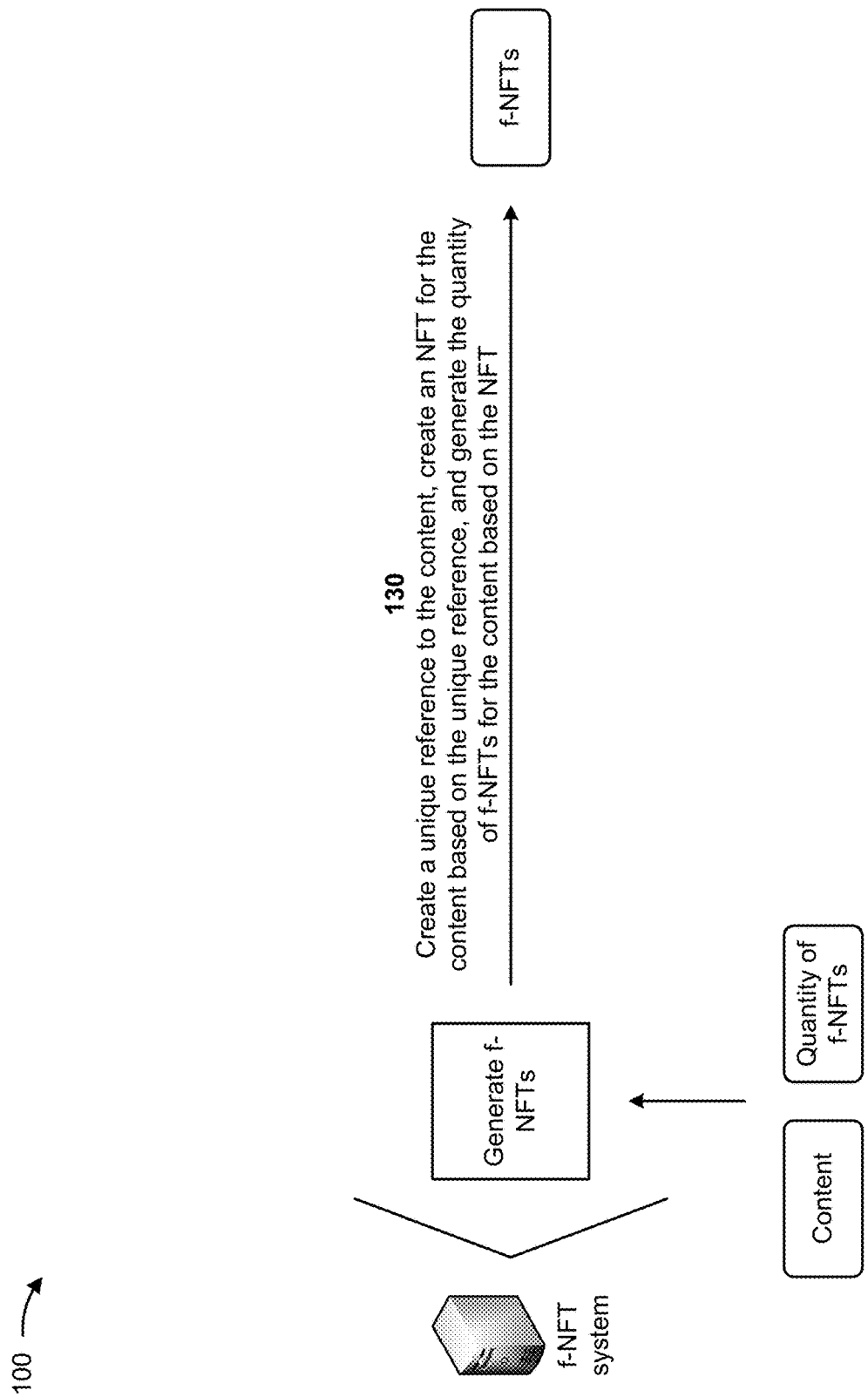
Figure 1F:
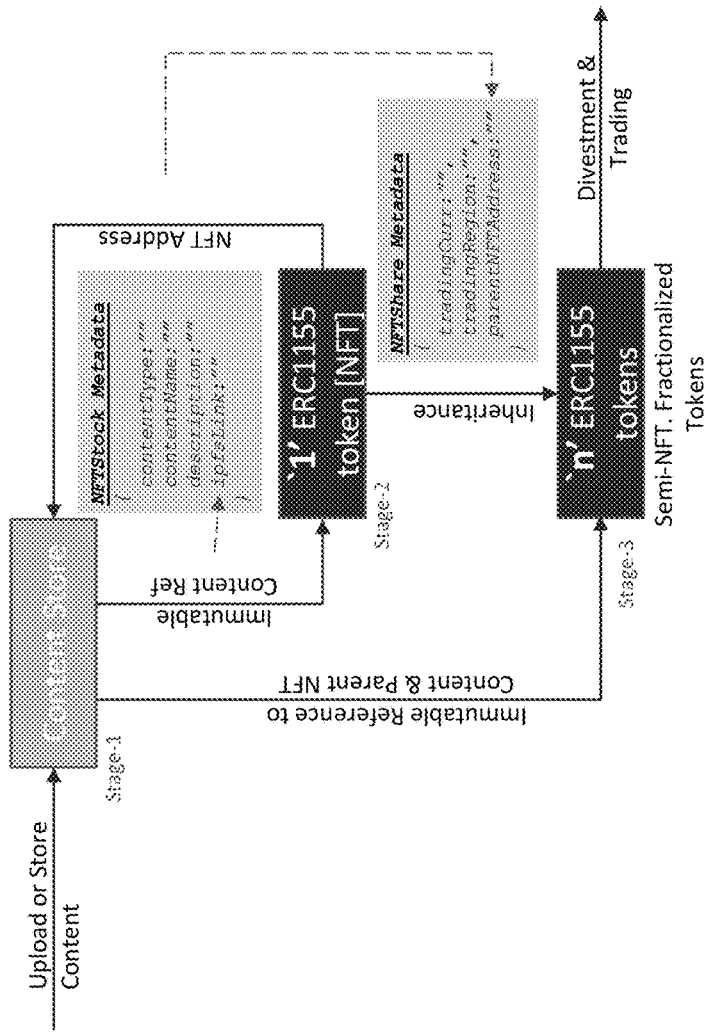

As shown in FIG. 1E, and by reference number 130, the f-NFT system may create a unique reference to the content, may create an NFT for the content based on the unique reference, and may generate the quantity of f-NFTs for the content based on the NFT. For example, the f-NFT system may utilize a two-tier hierarchical token framework, as depicted in FIG. 1F, to generate the quantity of f-NFTs for the content. The framework may create the unique reference to the content, may create the NFT for the content based on the unique reference, and may generate the quantity of f-NFTs for the content based on the NFT. In some implementations, when creating the unique reference to the content, the f-NFT system (e.g., via the framework) may create an immutable storage reference (e.g., a blockchain) for the content (e.g., on a file sharing system, such as the interplanetary file system (IPFS)), and may retrieve the immutable storage reference as the unique reference. In some implementations, when creating the NFT for the content, the f-NFT system (e.g., via the framework) may deploy a stock contract for the NFT, may create the NFT with the unique reference as input and based on the stock contract, and may retrieve an address of the NFT. In some implementations, when generating the quantity of f-NFTs for the content based on the NFT, the f-NFT system (e.g., via the framework) may create an immutable reference for the address of the NFT, may deploy the stock contract, and may generate the quantity of f-NFTs with the immutable reference and based on the stock contract.

FIG. 1F depicts the two-tier hierarchical token framework utilized by the f-NFT system to generate the quantity of f-NFTs for the content. As shown on the left side of FIG. 1F, the stock contract (e.g., NFTStock) may include one NFT per content (e.g., with metadata of the content and a contract address) or multiple (e.g., n) f-NFTs per content (e.g., trading units (shares) that inherit a contract address of the NFT as part of metadata); the contract data may include minimum holdings by an owner of the NFT, f-NFTs in circulation, a value of each of the f-NFTs, and a list of shareholders of the f-NFTs and their holdings (e.g., quantities of the f-NFTs); and mint functionality that defines and mines the NFT and the f-NFTs. As shown on the right side of FIG. 1F, at stage 1, the framework may create the unique reference to the content by creating an immutable storage reference for the content (e.g., on IPFS) and retrieving the immutable storage reference as the unique reference. As further shown on the right side of FIG. 1F, at stage 2, the framework may create the NFT for the content by deploying the stock contract for the NFT, creating the NFT with the unique reference as input and based on the stock contract, and retrieving the address of the NFT. As further shown on the right side of FIG. 1F, at stage 3, the framework may generate the quantity of f-NFTs for the content by creating an immutable reference for the address of the NFT, deploying the stock contract, and generating the quantity of f-NFTs with the immutable reference and based on the stock contract. In some implementations, the f-NFTs may be utilized to establish a two-tier token hierarchy that is immutably recorded on a blockchain network to ensure data security and transaction safety with verified account holders.

Figure 1G:
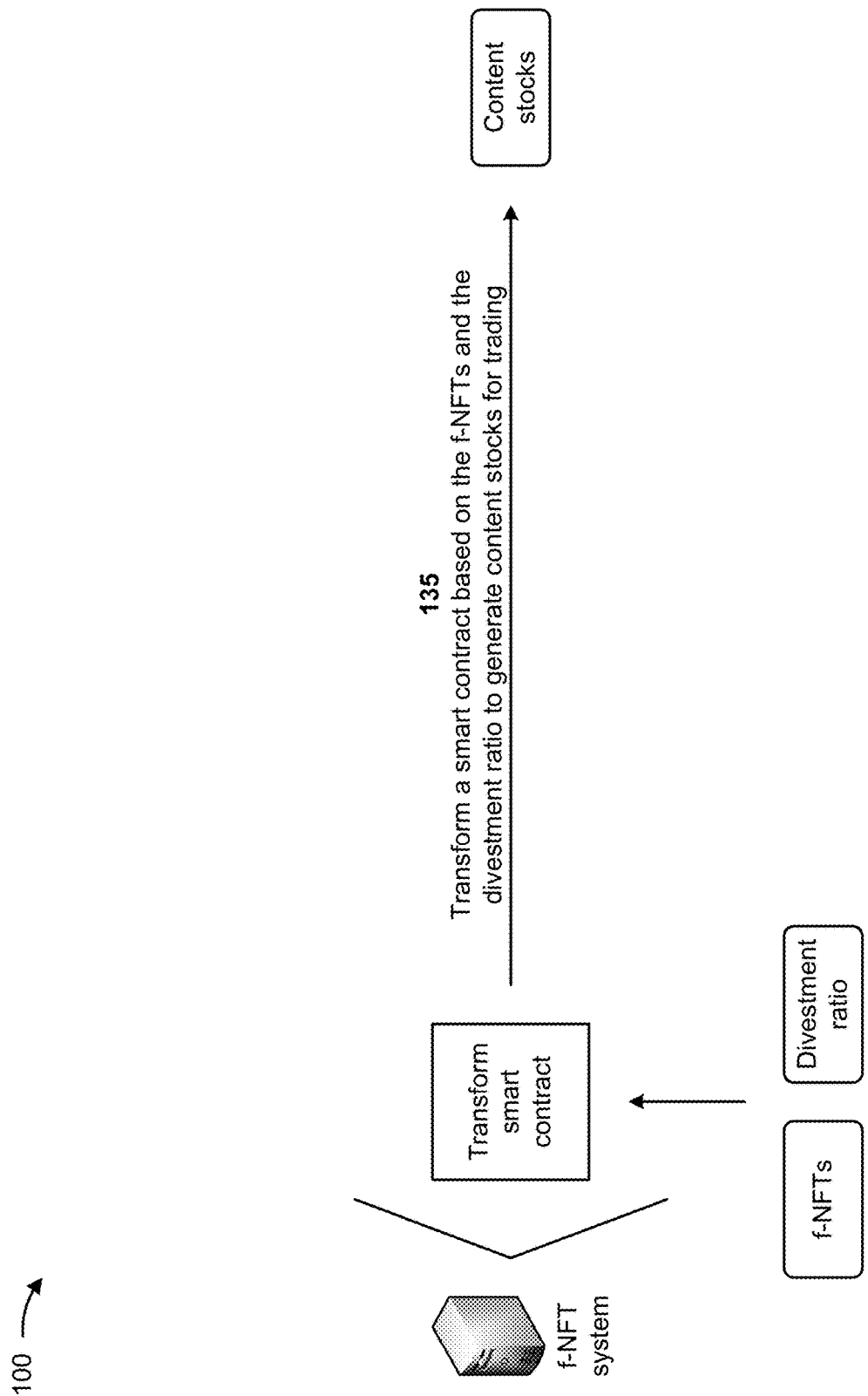
Figure 1H:
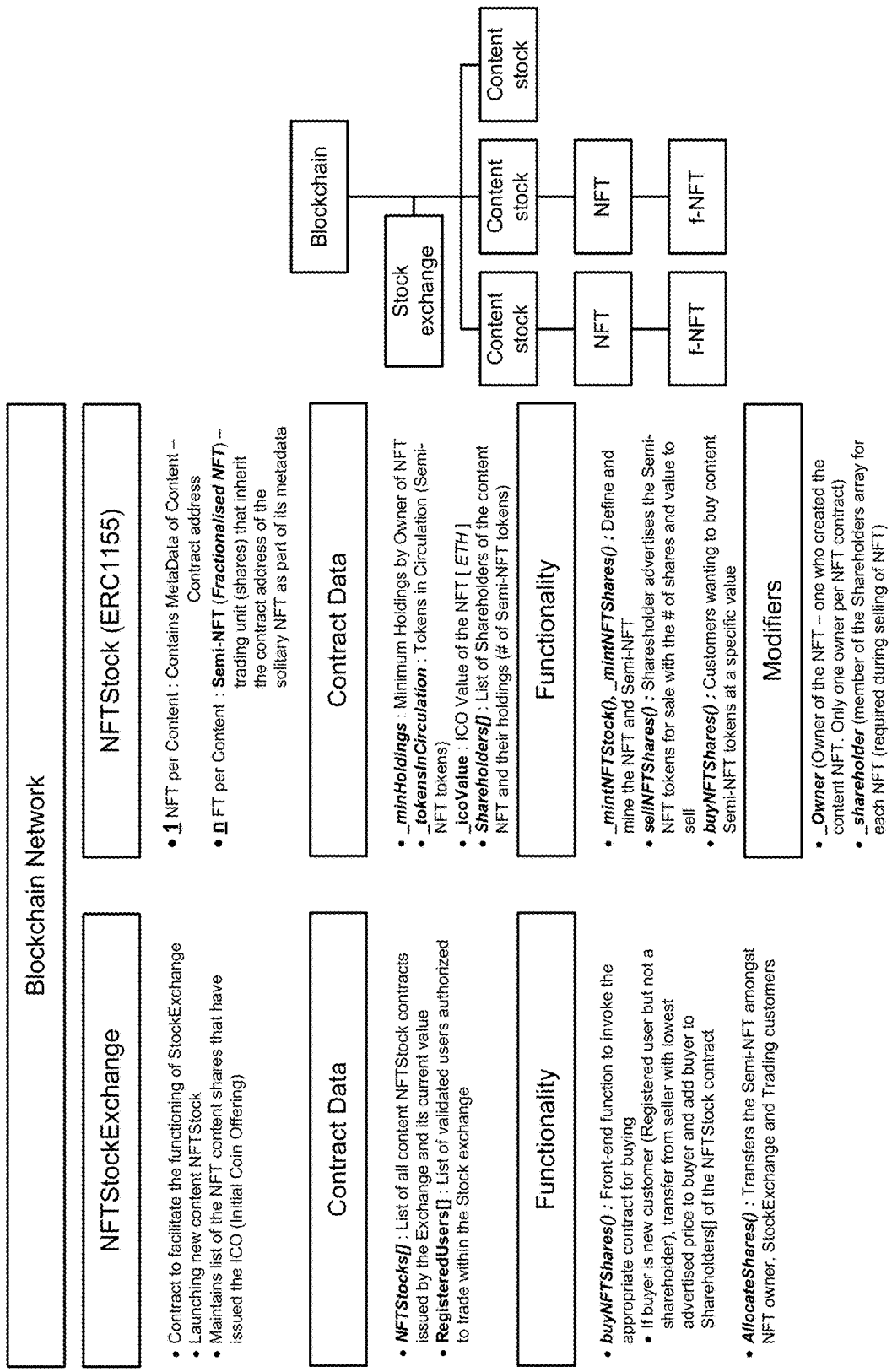

As shown in FIG. 1G, and by reference number 135, the f-NFT system may transform a smart contract based on the f-NFTs and the divestment ratio to generate content stocks for trading. For example, the f-NFT system may utilize the smart content exchange framework, as depicted in FIG. 1H, to generate the content stocks for trading. The smart content exchange framework may transform the smart contract based on the f-NFTs and the divestment ratio to generate the content stocks for trading. In some implementations, when transforming the smart contract based on the f-NFTs and the divestment ratio to generate the content stocks, the f-NFT system (e.g., via the smart content exchange framework) may transform the NFT with characteristics for trading, may create a shareholder modifier in the smart contract to permit shareholders to conduct transactions with the f-NFTs, and may apply transformation rules to the smart contract, based on the divestment ratio, to generate the content stocks.

FIG. 1H depicts smart content exchange framework utilized by the f-NFT system to generate the content stocks for trading. As shown on the left side of FIG. 1H, the stock exchange contract (e.g., NFTStockExchange) may include a contract that facilitates functioning of the content exchange, may launch new f-NFTs, and may maintain a list of the content stock shares that have issued; the contract data may include a list of all stock exchange contracts issued by the content exchange and a current value, and a list of validated users authorized to trade within the content exchange; and functionality that invokes an appropriate contract for buying f-NFTs and that transfers the f-NFTs among the NFT owner, the content exchange, and trading customers. As shown in the middle of FIG. 1H, the stock contract (e.g., NFTStock) may include one NFT per content (e.g., with metadata of the content and a contract address) or multiple (e.g., n) f-NFTs per content (e.g., trading unit (shares) that inherit a contract address of the NFT as part of metadata); the contract data may include minimum holdings by an owner of the NFT, f-NFTs in circulation, a value of each of the f-NFTs, and a list of shareholders of the f-NFTs and their holdings (e.g., quantities of the f-NFTs); functionality that defines and mines the NFT and the f-NFTs, that enables a shareholder to advertise the f-NFTs for sale with a quantity of shares and a value, and that enables customers to buy the f-NFTs at a specific value. As shown on the right side of FIG. 1H, the content exchange may be associated with a blockchain. The blockchain may be associated with the content stocks, and the content stocks may be associated with NFTs. The NFTs may be associated with the f-NFTs.

Figure 1I:
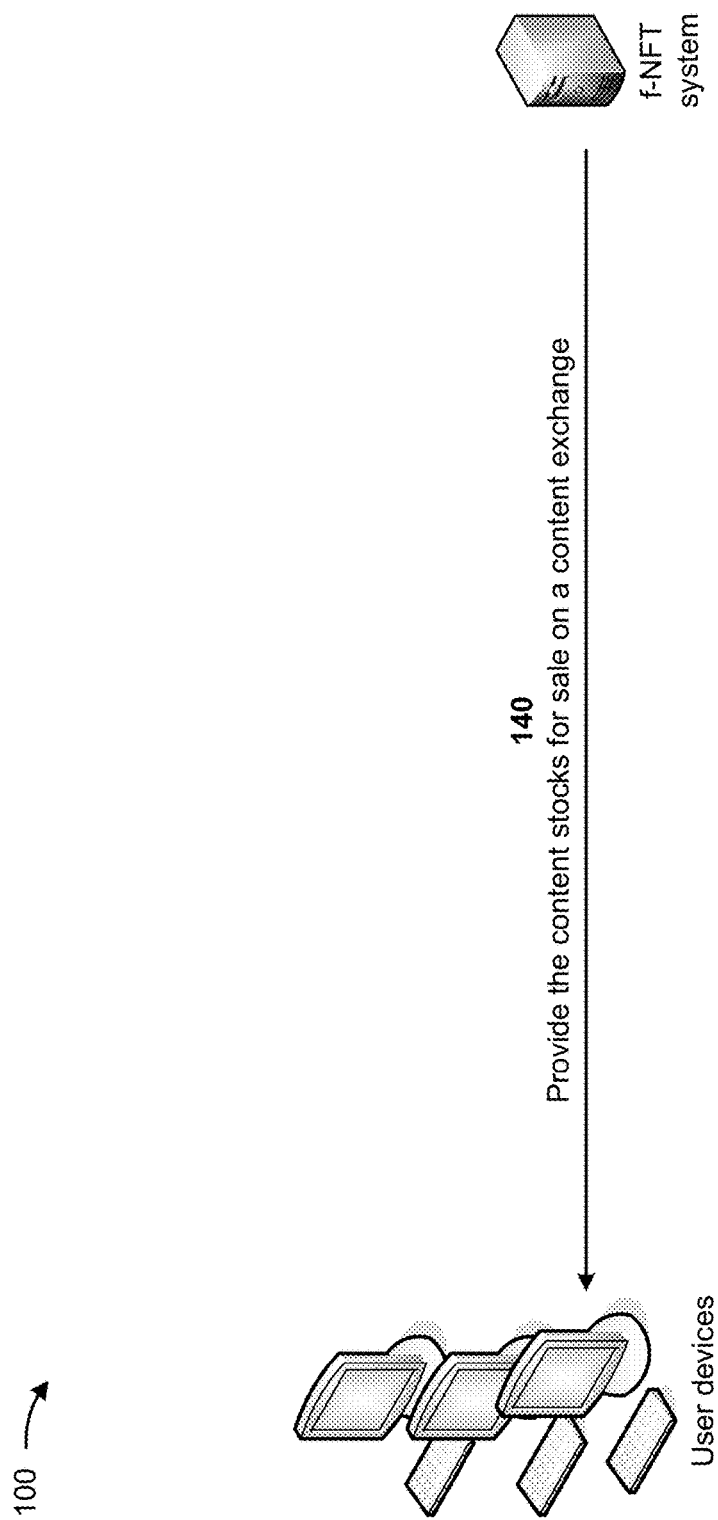

As shown in FIG. 1I, and by reference number 140, the f-NFT system may provide the content stocks for sale on a content exchange (e.g., to users of the user devices). For example, the f-NFT system may provide the content stocks for sale on the content exchange, and the content exchange may be deployed as a smart contract to keep track of the content stocks and to provide security. In some implementations, transactions conducted with the content stocks (e.g., the f-NFTs) on the content exchange may be permanently registered in an append-only mode on a decentralized network of nodes to ensure security, traceability to origin, and/or the like for content owners and shareholders. The content exchange may also permanently record the transactions on immutable ledgers. In some implementations, the f-NFT system may provide the f-NFTs to the content exchange, and the content exchange may transform a smart contract based on the f-NFTs and the divestment ratio to generate the content stocks for trading.

In this way, the f-NFT system determines an optimum quantity of f-NFTs to generate for content and a content exchange. The f-NFT system may provide a cryptocurrency-based valuation of content and a blockchain-based content trading exchange. The f-NFT system may determine scores for content of content providers, and may determine divestment metrics and quantities of f-NFTs to generate for the content based on the scores. The f-NFT system may transform NFTs of content into semi-fungible tokens (e.g., f-NFTs) that can be exchanged while maintaining the sanctity of ownership of the NFTs in the content providers. The f-NFT system may establish an immutable ledger of transactions, for the f-NFTs, that is written using smart contracts and policy-based real-time bookkeeping for authorizing and securing the transactions. This, in turn, conserves computing resources, networking resources, transportation resources, and/or the like that would otherwise have been consumed in attempting to identify content to utilize for NFTs, failing to identify valuable content to utilize for NFTs, erroneously liquidating NFTs associated with valuable content, failing to determine an appropriate quantity of NFTs to create for content, and/or the like.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
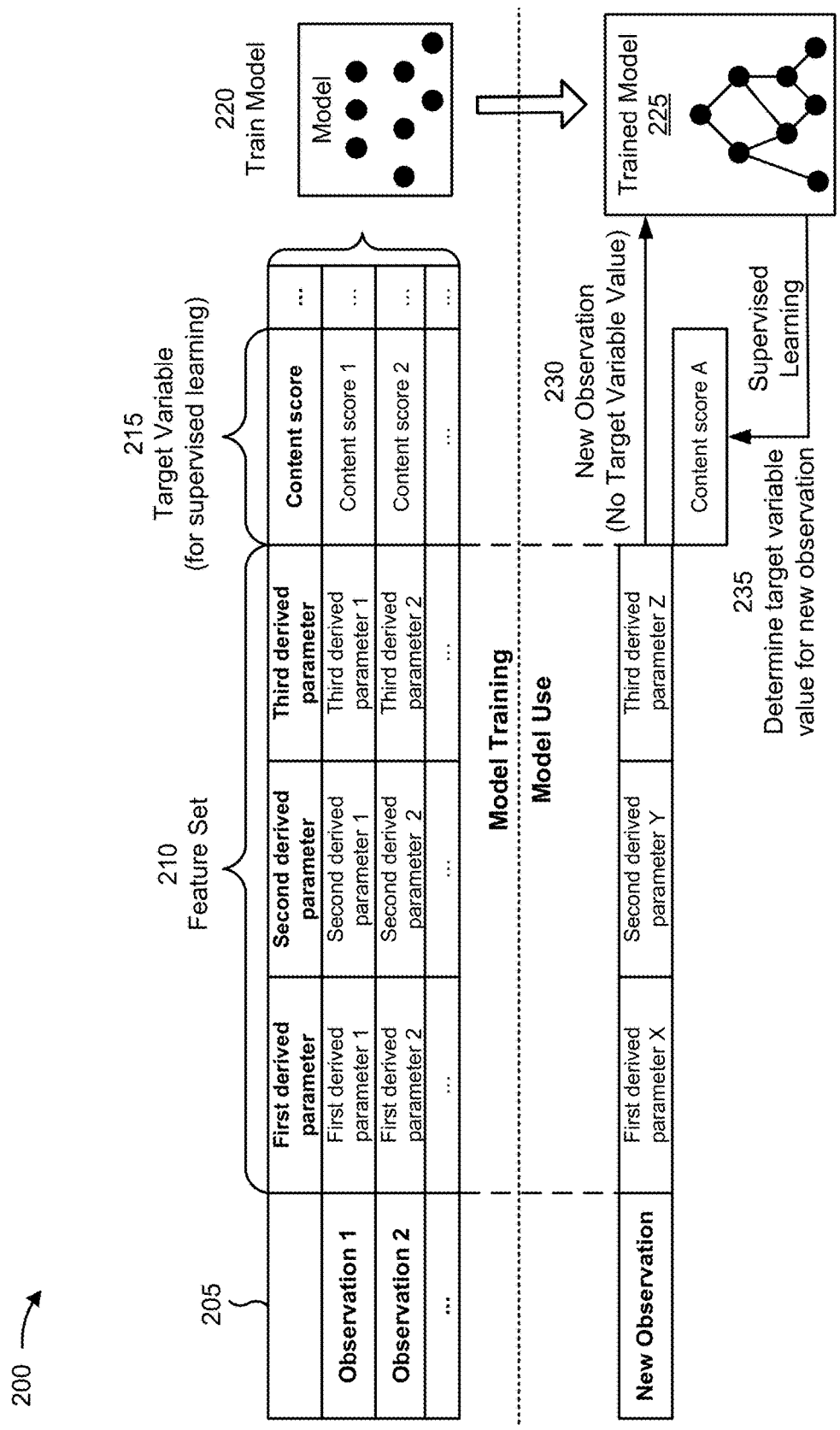
FIG. 2 is a diagram illustrating an example of training and using a machine learning model.

FIG. 2 is a diagram illustrating an example 200 of training and using a machine learning model for calculating a content score for content. The machine learning model training and usage described herein may be performed using a machine learning system. The machine learning system may include or may be included in a computing device, a server, a cloud computing environment, and/or the like, such as the f-NFT system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the f-NFT system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the f-NFT system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of a first derived parameter, a second feature of a second derived parameter, a third feature of a third derived parameter, and so on. As shown, for a first observation, the first feature may have a value of first derived parameter 1, the second feature may have a value of second derived parameter 1, the third feature may have a value of third derived parameter 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be a content score and may include a value of content score 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of first derived parameter X, a second feature of second derived parameter Y, a third feature of third derived parameter Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that indicates a degree of similarity between the new observation and one or more other observations, and/or the like.

As an example, the trained machine learning model 225 may predict a value of content score A for the target variable of the content score for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), and/or the like.

In this way, the machine learning system may apply a rigorous and automated process to calculate a content score for content. The machine learning system enables recognition and/or identification of tens, hundreds, thousands, or millions of features and/or feature values for tens, hundreds, thousands, or millions of observations, thereby increasing accuracy and consistency and reducing delay associated with calculating a content score for content relative to requiring computing resources to be allocated for tens, hundreds, or thousands of operators to manually calculate a content score for content.

As indicated above, FIG. 2 is provided as an example. Other examples may differ from what is described in connection with FIG. 2.

Figure 3:
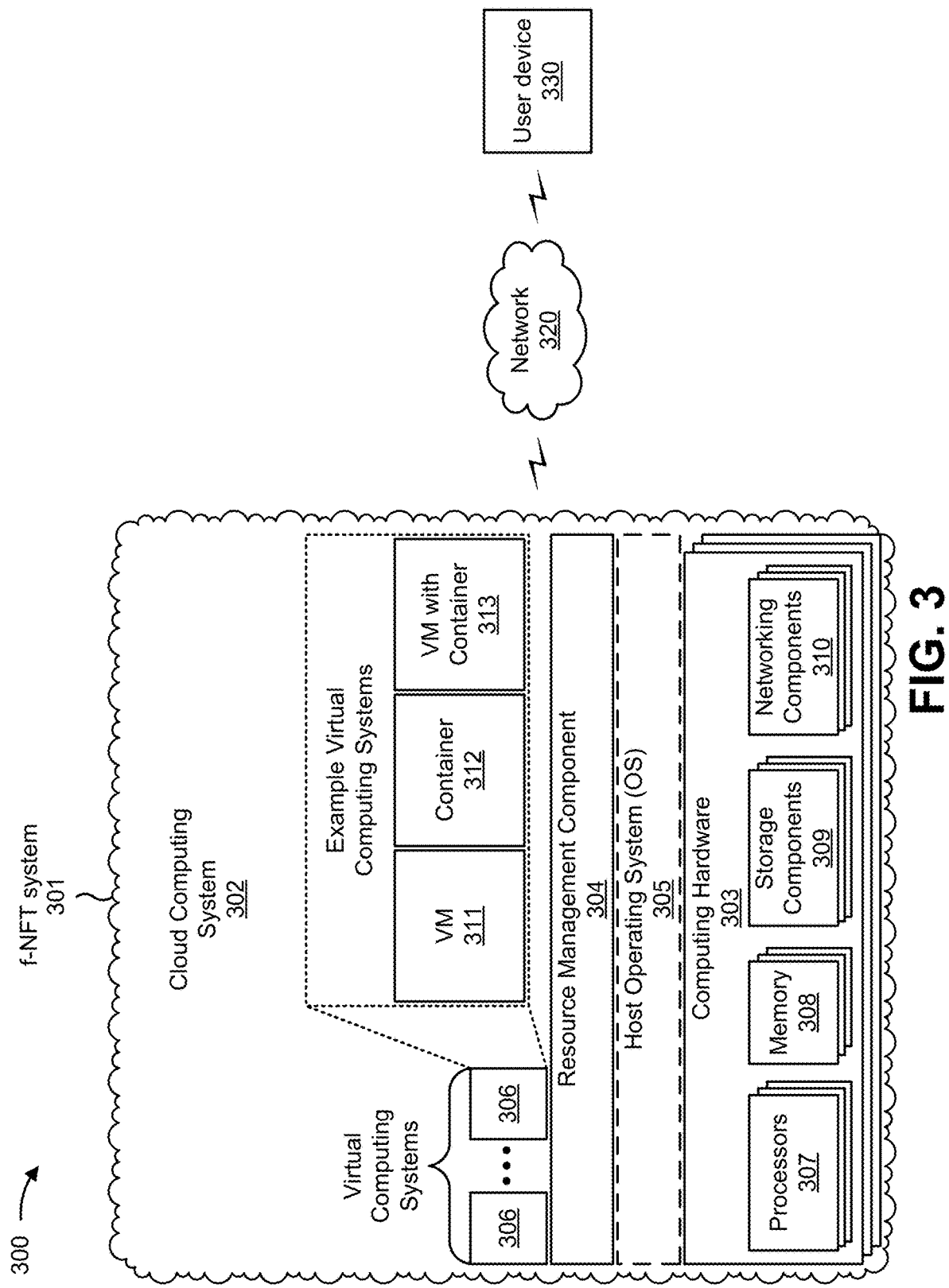
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include an f-NFT system 301, which may include one or more elements of and/or may execute within a cloud computing system 302. The cloud computing system 302 may include one or more elements 303-313, as described in more detail below. As further shown in FIG. 3, the environment 300 may include a network 320 and/or a user device 330. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the f-NFT system 301 may include one or more elements 303-313 of the cloud computing system 302, may execute within the cloud computing system 302, and/or may be hosted within the cloud computing system 302, in some implementations, the f-NFT system 301 may not be cloud-based (e.g., may be implemented outside of a cloud computing system) or may be partially cloud-based. For example, the f-NFT system 301 may include one or more devices that are not part of the cloud computing system 302, such as device 400 of FIG. 4, which may include a stand-alone server or another type of computing device. The f-NFT system 301 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The user device 330 includes one or more devices capable of receiving, generating, storing, processing, and/or providing information, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
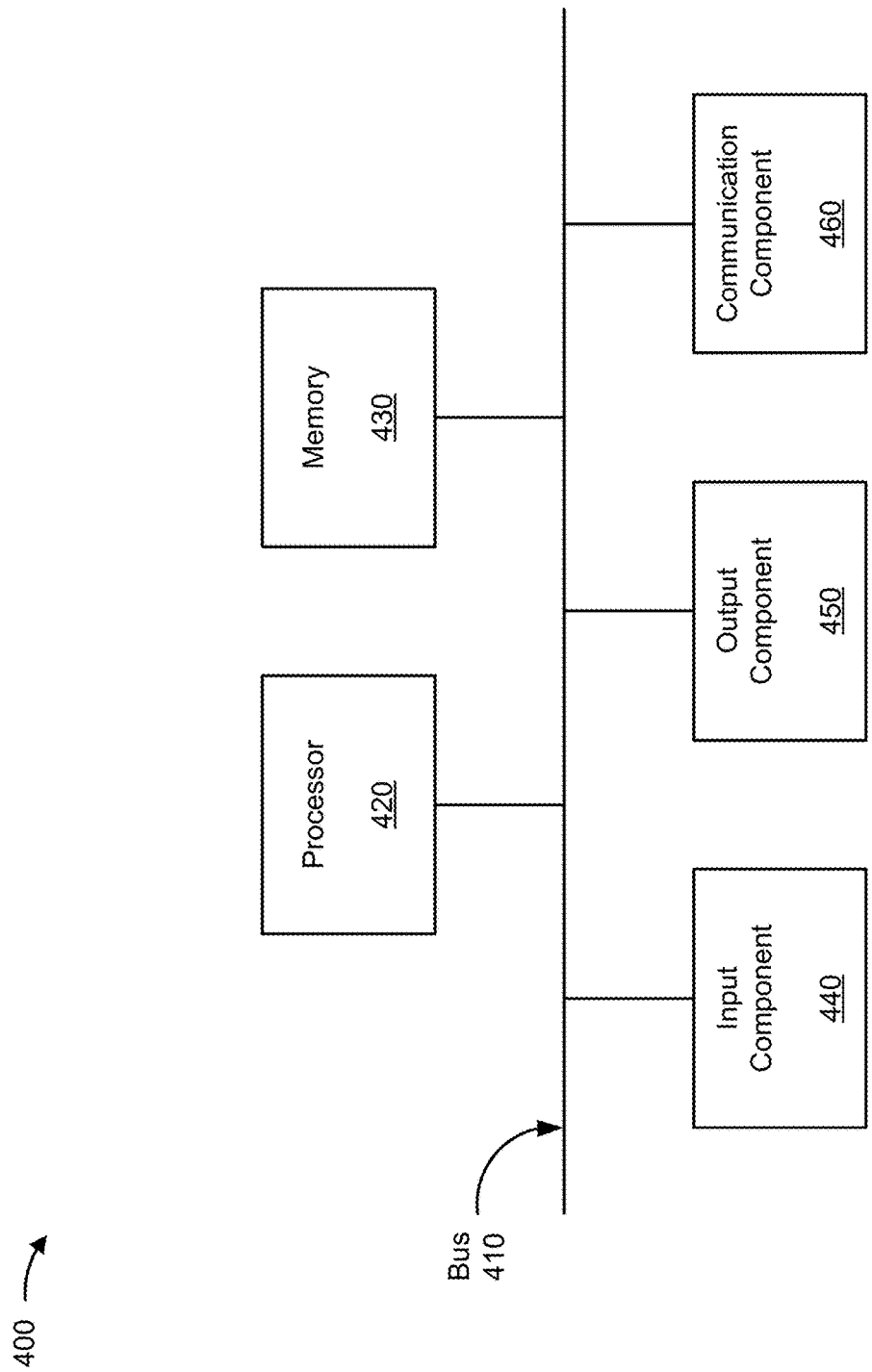
FIG. 4 is a diagram of example components of one or more devices of FIG. 3.

FIG. 4 is a diagram of example components of a device 400, which may correspond to the f-NFT system 301 and/or the user device 330. In some implementations, the f-NFT system 301 and/or the user device 330 may include one or more devices 400 and/or one or more components of the device 400. As shown in FIG. 4, the device 400 may include a bus 410, a processor 420, a memory 430, an input component 440, an output component 450, and a communication component 460.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The input component 440 enables the device 400 to receive input, such as user input and/or sensed inputs. For example, the input component 440 may include a touch screen, a keyboard, a keypad, a mouse, a button, a microphone, a switch, a sensor, a global positioning system component, an accelerometer, a gyroscope, an actuator, and/or the like. The output component 450 enables the device 400 to provide output, such as via a display, a speaker, and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, an antenna, and/or the like.

The device 400 may perform one or more processes described herein. For example, a non-transitory computer-readable medium (e.g., the memory 430) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for determining an optimum quantity of f-NFTs to generate for content and a content exchange. In some implementations, one or more process blocks of FIG. 5 may be performed by a device (e.g., the f-NFT system 301). In some implementations, one or more process blocks of FIG. 5 may be performed by another device or a group of devices separate from or including the device, such as a user device (e.g., the user device 330). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include identifying standard parameters and real-time parameters associated with content of a content type (block 510). For example, the device may identify standard parameters and real-time parameters associated with content of a content type, as described above. In some implementations, the content type includes one or more of text, image, video, or audio.

As further shown in FIG. 5, process 500 may include processing the content type, the standard parameters, and the real-time parameters, with a parameter unification model, to generate derived parameters for the content (block 520). For example, the device may process the content type, the standard parameters, and the real-time parameters, with a parameter unification model, to generate derived parameters for the content, as described above. In some implementations, processing the content type, the standard parameters, and the real-time parameters, with the parameter unification model, to generate the derived parameters includes utilizing an environmental, social, and governance report to generate the derived parameters. In some implementations, the derived parameters represent one or more characteristics of the content.

As further shown in FIG. 5, process 500 may include processing the derived parameters and the content type, with a multi-level linear regression machine learning model, to calculate a content score for the content (block 530). For example, the device may process the derived parameters and the content type, with a multi-level linear regression machine learning model, to calculate a content score for the content, as described above. In some implementations, processing the derived parameters and the content type, with the multi-level linear regression machine learning model, to calculate the content score includes assigning weights to the derived parameters to calculate the content score based on the content type. In some implementations, the multi-level linear regression machine learning model includes a linear regression model using a deep neural network model to calculate the content score according to the content type.

As further shown in FIG. 5, process 500 may include processing the derived parameters and the content score, with a linear regression machine learning model, to calculate a quantity of f-NFTs to generate for the content and a divestment ratio for the content (block 540). For example, the device may process the derived parameters and the content score, with a linear regression machine learning model, to calculate a quantity of f-NFTs to generate for the content and a divestment ratio for the content, as described above. In some implementations, processing the derived parameters and the content score, with the linear regression machine learning model, to calculate the quantity of f-NFTs to generate for the content and the divestment ratio for the content includes calculating the quantity of f-NFTs and the divestment ratio based on the content score and based on the derived parameters that influence a future capability of the content.

As further shown in FIG. 5, process 500 may include creating a unique reference to the content (block 550). For example, the device may create a unique reference (e.g., on a blockchain) to the content, as described above. In some implementations, creating the unique reference to the content includes creating an immutable storage reference for the content, and retrieving the immutable storage reference as the unique reference.

As further shown in FIG. 5, process 500 may include creating an NFT for the content based on the unique reference (block 560). For example, the device may create an NFT for the content based on the unique reference, as described above. In some implementations, creating the NFT for the content includes deploying a stock contract for the NFT, creating the NFT with the unique reference as input and based on the stock contract, and retrieving an address of the NFT.

As further shown in FIG. 5, process 500 may include generating the quantity of f-NFTs for the content based on the NFT (block 570). For example, the device may generate the quantity of f-NFTs for the content based on the NFT, as described above. In some implementations, generating the quantity of f-NFTs for the content based on the NFT includes creating an immutable reference for an address of the NFT, deploying a stock contract, and generating the quantity of f-NFTs with the immutable reference and based on the stock contract.

As further shown in FIG. 5, process 500 may include providing the quantity of f-NFTs to a content exchange (block 580). For example, the device may provide the quantity of f-NFTs to a content exchange, as described above. In some implementations, the content exchange is deployed as a smart contract to keep track of the content stocks and to provide security. In some implementations, the f-NFT system may establish an immutable ledger of transactions, for the f-NFTs, that is written using smart contracts and policy-based real-time bookkeeping for authorizing and securing the transactions.

In some implementations, process 500 includes transforming a smart contract based on the f-NFTs and the divestment ratio to generate content stocks for trading, and providing the content stocks for sale on the content exchange. In some implementations, transforming the smart contract based on the f-NFTs and the divestment ratio to generate the content stocks includes transforming the NFT with characteristics for trading, creating a shareholder modifier in the smart contract to permit shareholders to conduct transactions with the f-NFTs, and applying transformation rules to the smart contract, based on the divestment ratio, to generate the content stocks.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   identifying, by a device, standard parameters and real-time parameters associated with content of a content type;
   processing, by the device, the content type, the standard parameters, and the real-time parameters, with a parameter unification model, to generate derived parameters for the content;
   calculating, by the device, a content score for the content, by processing the derived parameters and the content type, with a multi-level linear regression machine learning model, wherein the content score is a score of a respective content provider of content providers for the content;
   calculating, by the device, a quantity of fractional non-fungible tokens (f-NFTs) and a divestment ratio for the content, by processing the derived parameters and the content score, with a linear regression machine learning model;
   creating, by the device, a unique reference to the content;
   creating, by the device, a non-fungible token (NFT) for the content based on the unique reference; and
   providing, by the device, based on the calculated quantity of f-NFTs and the NFT, the quantity of f-NFTs to a content exchange.

2. The method of claim 1, further comprising:
   transforming a smart contract based on the f-NFTs and the divestment ratio to generate content stocks for trading; and
   providing the content stocks for sale on the content exchange.

3. The method of claim 2, wherein transforming the smart contract based on the f-NFTs and the divestment ratio to generate the content stocks comprises:
   transforming the NFT with characteristics for trading;
   creating a shareholder modifier in the smart contract to permit shareholders to conduct transactions with the f-NFTs; and
   applying transformation rules to the smart contract, based on the divestment ratio, to generate the content stocks.

4. The method of claim 1, wherein the content type includes one or more of:
   text,
   image,
   video, or
   audio.

5. The method of claim 1, wherein processing the content type, the standard parameters, and the real-time parameters, with the parameter unification model, to generate the derived parameters comprises:
   utilizing an environmental, social, and governance report to generate the derived parameters.

6. The method of claim 1, wherein the derived parameters represent one or more characteristics of the content.

7. The method of claim 1, wherein calculating the content score by processing the derived parameters and the content type, with the multi-level linear regression machine learning model:
   assigning weights to the derived parameters to calculate the content score based on the content type.

8. A device, comprising:
   one or more memories; and
   one or more processors, coupled to the one or more memories, configured to:
   identify standard parameters and real-time parameters associated with content of a content type;
   process the content type, the standard parameters, and the real-time parameters, with a parameter unification model, to generate derived parameters for the content;
   calculate a content score for the content, by processing the derived parameters and the content type, with a multi-level linear regression machine learning model, wherein the content score is a score of a respective content provider of content providers for the content;
   calculate a quantity of fractional non-fungible tokens (f-NFTs) and a divestment ratio for the content, by processing the derived parameters and the content score, with a linear regression machine learning model;
   create a unique reference to the content;
   create a non-fungible token (NFT) for the content based on the unique reference;
   transform a smart contract based on the calculated quantity f-NFTs, NFT, and the divestment ratio to generate content stocks for trading; and
   provide the content stocks for sale on a content exchange.

9. The device of claim 8, wherein the multi-level linear regression machine learning model includes a linear regression model using a deep neural network model to calculate the content score according to the content type.

10. The device of claim 8, wherein the one or more processors, to calculate the quantity of f-NFTs and the divestment ratio for the content by processing the derived parameters and the content score, with the linear regression machine learning model, are configured to:

calculate the quantity of f-NFTs and the divestment ratio based on the content score and based on the derived parameters that influence a future capability of the content.

11. The device of claim 8, wherein the one or more processors, to create the unique reference to the content, are configured to:
create an immutable storage reference for the content; and
retrieve the immutable storage reference as the unique reference.

12. The device of claim 8, wherein the one or more processors, to create the NFT for the content, are configured to:
deploy a stock contract for the NFT;
create the NFT with the unique reference as input and based on the stock contract; and
retrieve an address of the NFT.

13. The device of claim 8, wherein the one or more processors, to generate the quantity of f-NFTs for the content based on the NFT, are configured to:
create an immutable reference for an address of the NFT;
deploy a stock contract; and
generate the quantity of f-NFTs with the immutable reference and based on the stock contract.

14. The device of claim 8, wherein the content exchange is deployed as a smart contract to keep track of the content stocks and to provide security.

15. A non-transitory computer-readable medium storing a set of instructions, the set of instructions comprising:
one or more instructions that, when executed by one or more processors of a device, cause the device to:
identify standard parameters and real-time parameters associated with content of a content type;
process the content type, the standard parameters, and the real-time parameters, with a parameter unification model, to generate derived parameters for the content;
calculate a content score for the content, by processing the derived parameters and the content type, with a multi-level linear regression machine learning model, wherein the content score is a score of a respective content provider of content providers for the content;
calculate a quantity of fractional non-fungible tokens (f NFTs) and a divestment ratio for the content, by processing the derived parameters and the content score, with a linear regression machine learning model;
create a unique reference to the content;
create a non-fungible token (NFT) for the content based on the unique reference; and
perform, based on the calculated quantity of f-NFTs and the NFT, one or more actions based on the quantity of f-NFTs.

16. The non-transitory computer-readable medium of claim 15, wherein the one or more instructions, that cause the device to perform the one or more actions, cause the device to one or more of:
provide the quantity of f-NFTs to a content exchange; or
transform a smart contract based on the f-NFTs and the divestment ratio to generate content stocks and provide the content stocks for sale on the content exchange.

17. The non-transitory computer-readable medium of claim 15, wherein the one or more instructions, that cause the device to process the content type, the standard parameters, and the real-time parameters, with the parameter unification model, to generate the derived parameters, cause the device to:
utilize an environmental, social, and governance report to generate the derived parameters.

18. The non-transitory computer-readable medium of claim 15, wherein the one or more instructions, that cause the device to calculate the content score by processing the derived parameters and the content type, with the multi-level linear regression machine learning model, cause the device to:
assign weights to the derived parameters to calculate the content score based on the content type.

19. The non-transitory computer-readable medium of claim 15, wherein the one or more instructions, that cause the device to calculate the quantity of f-NFTs to generate for the content and the divestment ratio for the content by processing the derived parameters and the content score, with the linear regression machine learning model, cause the device to:
calculate the quantity of f-NFTs and the divestment ratio based on the content score and based on the derived parameters that influence a future capability of the content.

20. The non-transitory computer-readable medium of claim 15, wherein the one or more instructions, that cause the device to create the unique reference to the content, cause the device to:
create an immutable storage reference for the content; and
retrieve the immutable storage reference as the unique reference.

* * * * *